United States Patent
Garner (10) Patent No.: US 12,248,330 B2
(45) Date of Patent: *Mar. 11, 2025

(54) SMART SWITCH WITH FUNCTIONALITIES DETERMINED BASED ON A GROUNDED CONDUCTOR CONNECTION

(71) Applicant: ROKU, INC., San Jose, CA (US)

(72) Inventor: Gregory Mack Garner, Springdale, AZ (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,349

(22) Filed: Oct. 26, 2023

(65) Prior Publication Data

US 2024/0160234 A1    May 16, 2024

Related U.S. Application Data

(63) Continuation of application No. 17/165,700, filed on Feb. 2, 2021, now Pat. No. 11,860,654.

(51) Int. Cl.
| G05F 1/12 | (2006.01) |
| G06F 3/044 | (2006.01) |
| G06F 3/16 | (2006.01) |
| H04L 67/12 | (2022.01) |

(52) U.S. Cl.
CPC ............. *G05F 1/12* (2013.01); *G06F 3/044* (2013.01); *G06F 3/167* (2013.01); *H04L 67/12* (2013.01)

(58) Field of Classification Search
CPC . G05F 1/12; G06F 3/044; G06F 3/167; H04L 67/12
See application file for complete search history.

(56) References Cited

U.S. PATENT DOCUMENTS

| 7,336,463 | B2 | 2/2008 | Russell et al. |
| 10,123,393 | B1 | 11/2018 | Soto et al. |
| 11,860,654 | B2 * | 1/2024 | Garner ...................... G05F 1/12 |
| 2010/0231055 | A1 | 9/2010 | Black et al. |
| 2020/0106364 | A1 | 4/2020 | Papismedov et al. |
| 2020/0136362 | A1 | 4/2020 | Hodges et al. |

OTHER PUBLICATIONS

International Search Report and Written Opinion, PCT Appl. No. PCT/US2022/014960, filed Feb. 2, 2022, 11 pages, mailed May 19, 2022.

* cited by examiner

*Primary Examiner* — David D Davis
(74) *Attorney, Agent, or Firm* — Sterne, Kessler, Goldstein & Fox P.L.L.C.

(57) ABSTRACT

Disclosed herein are system, apparatus, article of manufacture, method, and computer program product embodiments for modifying the functionality of an alternating current (AC) controlling device. An example computer-implemented method includes determining whether an electrical terminal of an AC controlling device is connected to a grounded conductor. In response to determining that the electrical terminal is connected to the grounded conductor, the example computer-implemented method includes generating a first control signal configured to permit the AC controlling device to perform a function. In response to determining that the electrical terminal is not connected to the grounded conductor, the example computer-implemented method includes generating a second control signal configured to prevent the AC controlling device from performing the function.

20 Claims, 5 Drawing Sheets

SMART SWITCH WITH FUNCTIONALITIES DETERMINED BASED ON A GROUNDED CONDUCTOR CONNECTION

RELATED APPLICATIONS

This application is a continuation and claims benefit of U.S. patent application Ser. No. 17/165,700, filed Feb. 2, 2021 and now allowed, the content of which are herein incorporated by reference in their entireties.

BACKGROUND

Field

This disclosure is generally directed to electrical load control devices for controlling the power delivered from an alternating-current (AC) power source to an electrical load.

BACKGROUND

In today's world, wireless AC load control devices are used to control electrical loads, such as lighting devices, in residential and commercial structures. These load control devices must be connected to an AC power supply via a neutral wire to provide functionality when the load control device is switched off. Further, even when switched on, these load control devices can deliver insufficient or unstable power to the electrical load if not connected to the neutral wire, causing the load to flicker or otherwise function improperly. However, many older residential and commercial structures do not include neutral wires as required by these load control devices for proper functionality.

SUMMARY

Provided herein are system, apparatus, article of manufacture, method and/or computer program product embodiments, and/or combinations and sub-combinations thereof for modifying the functionality of an alternating current (AC) controlling device, such as a wireless smart light switch, when a neutral wire is available as well as when a neutral wire is not available.

An embodiment is directed to system, apparatus, article of manufacture, method and/or computer program product embodiments, and/or combinations and sub-combinations thereof. In a non-limiting embodiment, the apparatus may be an AC controlling device. The apparatus may include a first electrical terminal configured to connect to a first ungrounded conductor (e.g., a black-coated hot or line electrical wire) and receive electricity from the first ungrounded conductor. The apparatus may further include a second electrical terminal configured to connect to a grounded conductor (e.g., a white-coated neutral electrical wire) and transmit a first portion of the electricity received from the first ungrounded conductor to the grounded conductor in response to a connection of the second electrical terminal to the grounded conductor. The apparatus may further include a third electrical terminal configured to connect to a second ungrounded conductor (e.g., a red-coated or black-coated load electrical wire) and transmit a second portion of the electricity received from the first ungrounded conductor to the second ungrounded conductor in response to an actuation of an electrical switching device. The apparatus may further include a fourth electrical terminal configured to connect to a grounding conductor (e.g., a green-coated or uncoated ground electrical wire).

The apparatus may further include the electrical switching device (e.g., a dimmable electrical switch). The electrical switching device may be configured to generate a conductive electrical path between the first electrical terminal and the third electrical terminal in response to the actuation of the electrical switching device. The electrical switching device may be further configured to generate a nonconductive electrical path between the first electrical terminal and the third electrical terminal in response to a deactuation of the electrical switching device.

The apparatus may further include a memory and at least one processor coupled to the memory and configured to determine whether the second electrical terminal is connected to the grounded conductor. The at least one processor may be further configured to generate, in response to a first determination that the second electrical terminal is connected to the grounded conductor, a first control signal configured to permit the performance of a function. The function may include, for example, a capacitive sensing function, a temperature sensing function, a radiation sensing function, an audio sensing function, a wireless communications function, a dimmer switch modification function, a lighting control function, any other suitable function, or any combination thereof. The at least one processor may be further configured to generate, in response to a second determination that the second electrical terminal is not connected to the grounded conductor, a second control signal configured to prevent the performance of the function.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
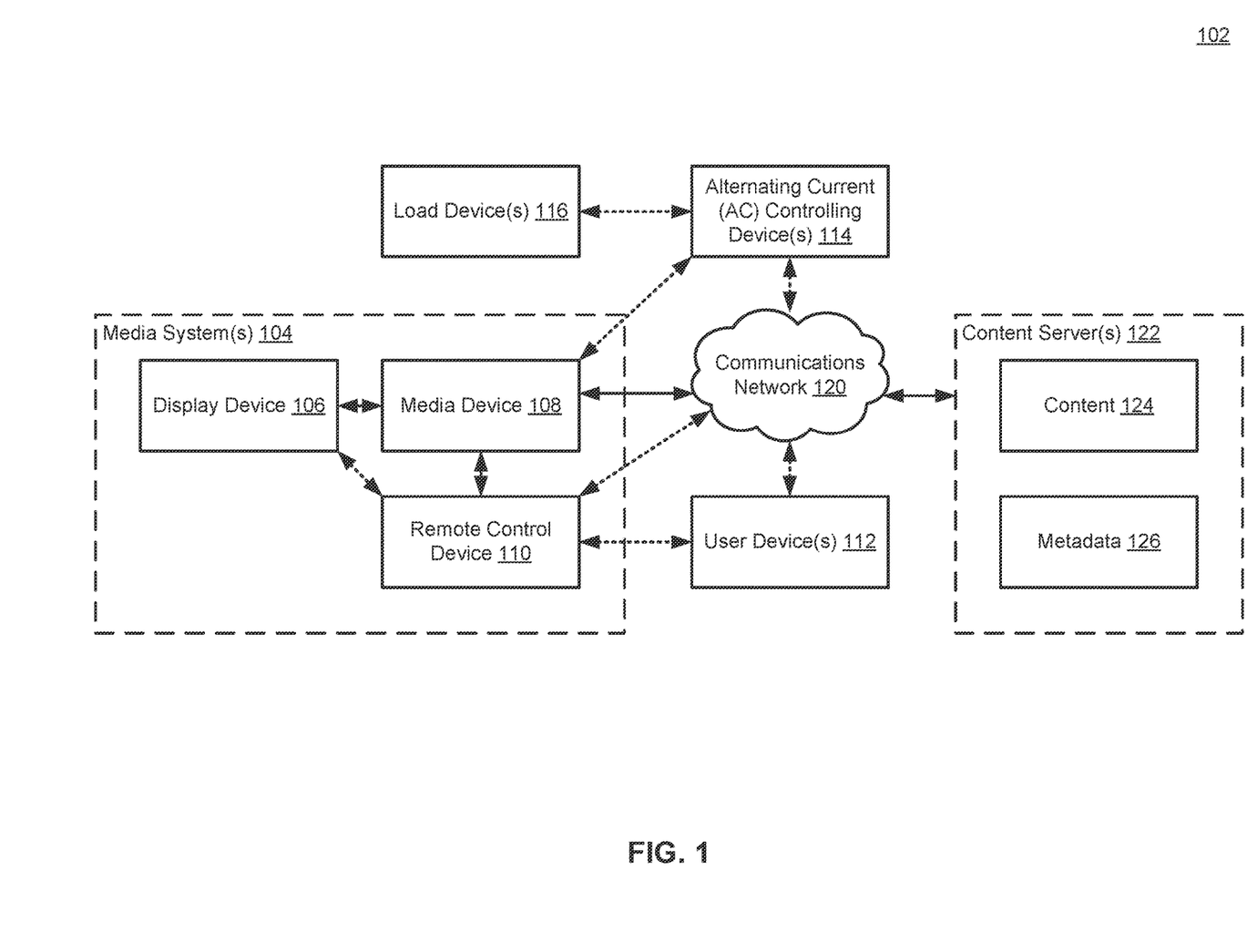
FIG. 1 illustrates a block diagram of a multimedia environment that includes one or more media systems and one or more AC controlling devices, according to some embodiments.

FIG. 1 illustrates a block diagram of multimedia environment 102, according to some embodiments. In a non-limiting example, multimedia environment 102 is directed to streaming media.

Multimedia environment 102 may include one or more media systems 104, one or more AC controlling devices 114, one or more load devices 116, one or more user devices 112, and one or more content servers 122, communicatively coupled via communications network 120. In various embodiments, communications network 120 can include, without limitation, wired and/or wireless intranet, extranet, Internet, Wi-Fi, radio frequency (RF), infrared (IR), cellular, Bluetooth and/or any other near-field, short range, long range, local, regional, global communications network, as well as any combination thereof. In some embodiments, the one or more media systems 104, one or more AC controlling devices 114, one or more load devices 116, and one or more user devices 112 may be located in or near (e.g., within 0.5 miles of) the same residential or commercial structure (e.g., house, apartment, school, office, hospital, restaurant, shop, etc.).

One or more media systems 104 may each include display device 106, media device 108, and remote control device 110. Display device 106 may be a monitor, TV, smart TV, computer, smart phone, tablet, and/or projector, to name just a few examples. Media device 108 may be a streaming media device, DVD device, audio/video playback device, cable box, and/or digital video recording device, to name just a few examples. In some embodiments, media device 108 can be a part of, integrated with, operatively coupled to, and/or connected to display device 106. Media device 108 may be configured to communicate with communications network 120. Remote control device 110 may be configured to communicate with display device 106, media device 108, or any other component of multimedia environment 102 using RF signals, Wi-Fi signals, Bluetooth signals, any other suitable signals, or any combination thereof. [OM] User device 112 may interact with one or more media systems 104 via remote control device 110. Remote control device 110 can be any component, part, apparatus or method for controlling media device 108 and/or display device 106 using wireless communications. For example, remote control device 110 may generate control signals corresponding to user commands and transmit the generated control signals to media device 108, display device 106, and/or any other component in multimedia environment 102, to cause that device or component to operate according to the user commands.

User device 112 may interact with one or more load devices 116 (e.g., light bulbs, dimmable light bulbs, smart light bulbs, media devices, etc.) via one or more AC controlling devices 114. One or more AC controlling devices 114 can include any component, part, apparatus or method for controlling the brightness, color, status, functionality, or any other suitable characteristic of one or more load devices 116 using wireless communications, including dimming or turning on or off one or more of one or more load devices 116. For example, one or more AC controlling devices 114 may generate control signals corresponding to user commands and transmit the generated control signals to one or more AC controlling devices 114 and/or any other component in multimedia environment 102 to cause that device or component to operate according to the user commands.

In some embodiments, one or more AC controlling devices 114 can function both with and without a neutral wire. For example, when an AC controlling device 114 boots up, it can detect the presence or absence of the neutral wire.

In an embodiment, if the neutral wire is present, then AC controlling device 114 can put itself into a more full-featured mode where it can perform functions such as having capacitive sensing functionality always on, or using a power hungry wireless communications protocol (e.g., WiFi mesh, Bluetooth, or 5G). In other words, if the neutral wire is present, AC controlling device 114 can enable other more complex energy intensive features.

In an embodiment, if the neutral wire is not present, then AC controlling device 114 can limit the enabled features to be the bare minimum features that will work when minimal power is available. For example, AC controlling device 114 can stay sleeping until a user presses a physical button on AC controlling device 114 or performs some other physical motion to wake up AC controlling device 114, in which case AC controlling device 114 uses a low power mechanism to send out the WiFi command to the load device 116 being controlled. In another example, AC controlling device 114 may transmit updates to, or receive updates from, outside devices at a reduced frequency (e.g., look for control packets once a second). As a result, the one or more AC controlling devices 114 can modify their functionality based on the neutral wire presence.

One or more content servers 122 (also called one or more content sources) may each include one or more databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 includes data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to content 124. Metadata 126 may also or alternatively include links to any such information pertaining or relating to content 124. Metadata 126 may also or alternatively include one or more indexes of content 124, such as but not limited to a trick mode index.

Figure 2:
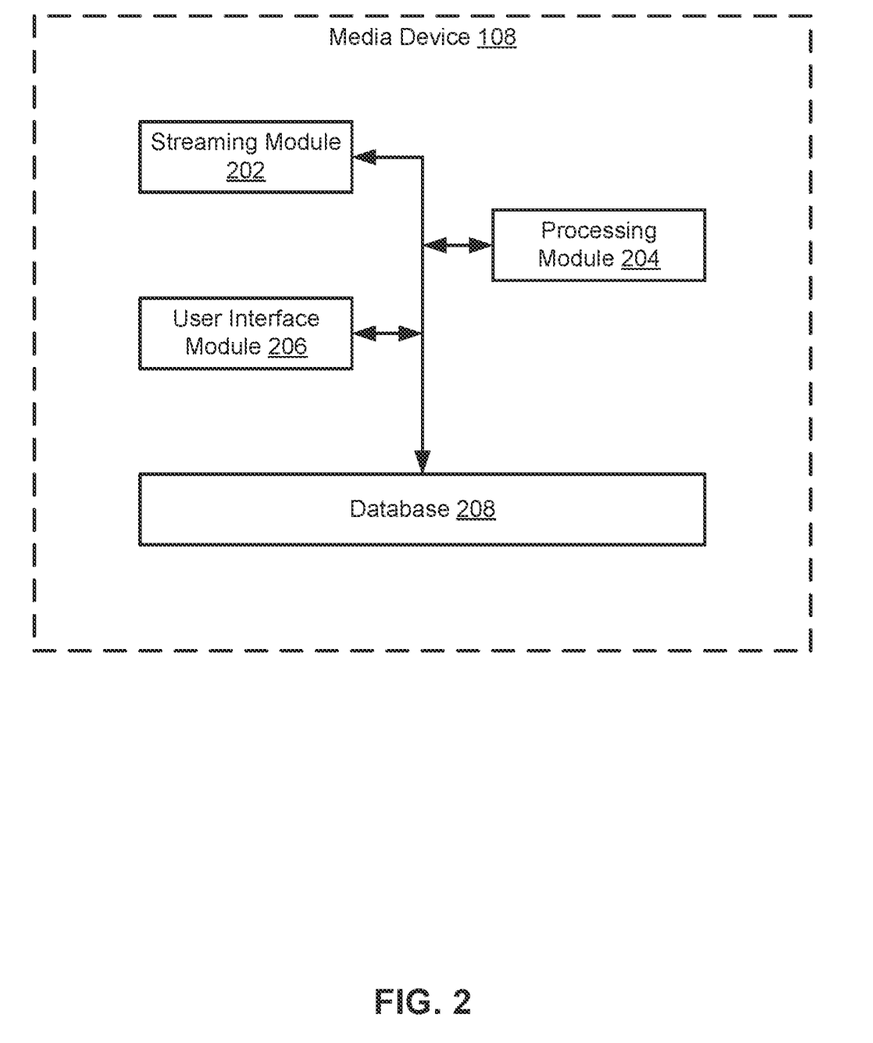
FIG. 2 illustrates a block diagram of a media device, according to some embodiments.

FIG. 2 illustrates an example block diagram of media device 108, according to some embodiments. Media device 108 may include streaming module 202, processing module 204, user interface module 206, and database 208. In an embodiment, a user may use remote control device 110 to interact with user interface module 206 of media device 108 to select content, such as a movie, TV show, music, book, application, game, or other content. Streaming module 202 of media device 108 may request the selected content from one or more content servers 122 over communications network 120. One or more content servers 122 may transmit the requested content to streaming module 202. Media device 108 may transmit the received content to display device 106 for presentation to a user of user device 112. In streaming embodiments, streaming module 202 may transmit the content to display device 106 in real time or near real time as it receives such content from one or more content servers 122. In non-streaming embodiments, media device 108 may buffer or store the content received from one or more content servers 122 in database 208 for later playback on display device 106.

Figure 3:
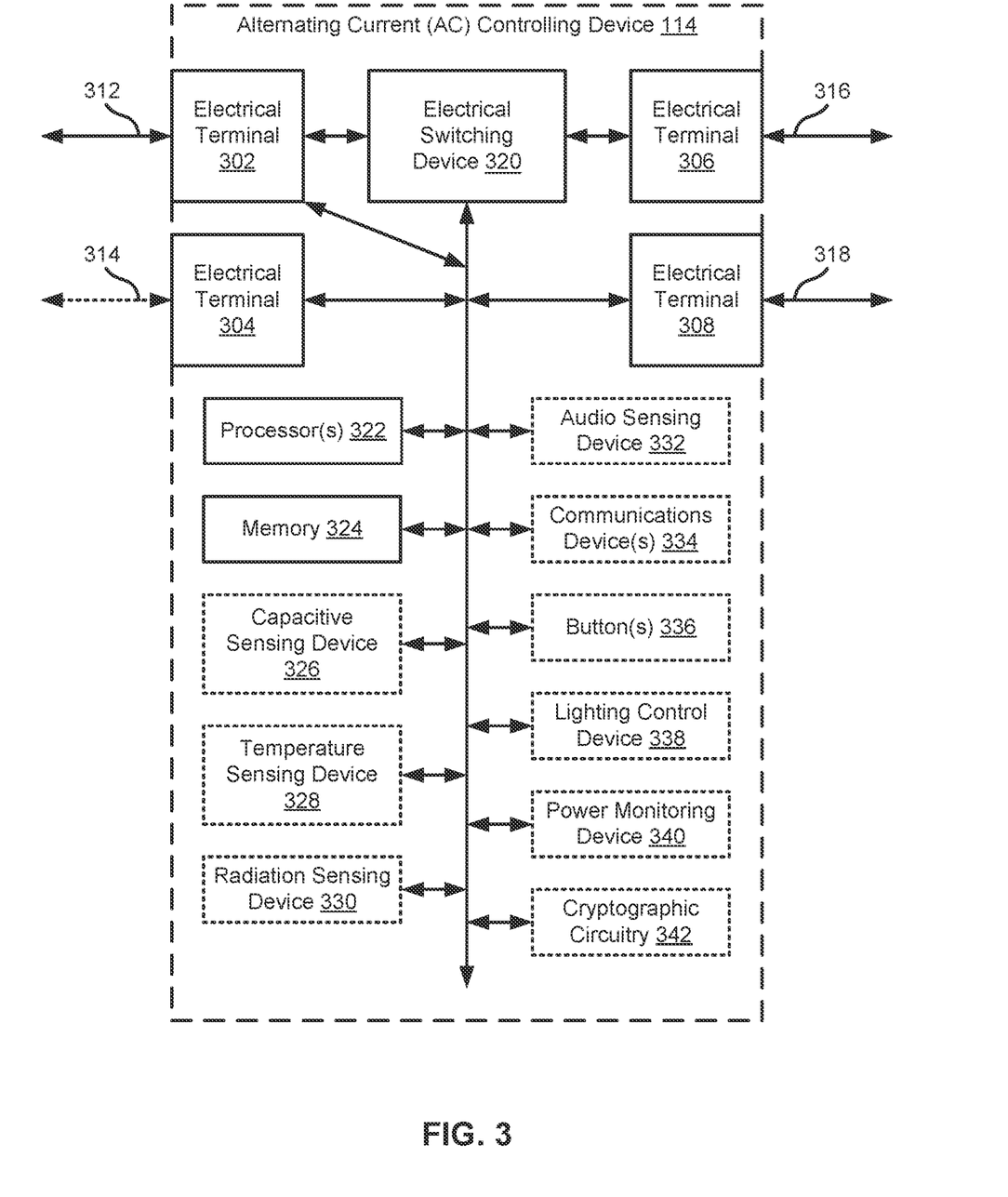
FIG. 3 is a block diagram of an AC controlling device, according to some embodiments.

FIG. 3 illustrates an example block diagram of AC controlling device 114, according to some embodiments. AC controlling device 114 may include, for example, first electrical terminal 302, second electrical terminal 304, third electrical terminal 306, fourth electrical terminal 308, electrical switching device 320, one or more processors 322, memory 324, capacitive sensing device 326 (e.g., a touch detector), temperature sensing device 328 (e.g., thermocouple, thermistor), radiation sensing device 330 (e.g., an ambient light detector such as a photodetector, an IR sensor), audio sensing device 332 (e.g., a microphone, microphone array), one or more communications devices 334 (including, but not limited to, a wireless communications device), set of buttons 336 (e.g., one or more actuator devices (e.g., a motor), dimmer switches (e.g., rotatable or sliding), physical buttons, virtual buttons, soft buttons, touchscreen areas, augmented reality (AR) buttons, virtual reality (VR) buttons, any other suitable buttons, or any combination thereof), lighting control device 338, power monitoring device 340, cryptographic circuitry 342, any other suitable hardware, software, device, or structure, or any combination thereof.

Now referring to FIGS. 1, 2, and 3, in some embodiments, AC controlling device 114 may include a first electrical terminal 302 configured to connect to a first ungrounded conductor 312 (e.g., a black-coated hot or line electrical wire) and receive electricity from the first ungrounded conductor 312. AC controlling device 114 may further include a second electrical terminal 304 configured to connect to a grounded conductor 314 (e.g., a white-coated neutral electrical wire) and transmit a first portion of the electricity received from the first ungrounded conductor 312 to the grounded conductor 314 in response to a connection of the second electrical terminal 304 to the grounded conductor 314. AC controlling device 114 may further include a third electrical terminal 306 configured to connect to a second ungrounded conductor 316 (e.g., a red-coated or black-coated load electrical wire) and transmit a second portion of the electricity received from the first ungrounded conductor 312 to the second ungrounded conductor 316 in response to an actuation of an electrical switching device. AC controlling device 114 may further include a fourth electrical terminal 308 configured to connect to a grounding conductor 318 (e.g., a green-coated or uncoated ground electrical wire). In one illustrative example, the first ungrounded conductor 312 can be a line wire, the grounded conductor 314 can be a neutral wire (e.g., which may or may not be present), the second ungrounded conductor 316 can be a load wire, and the grounding conductor can be a ground wire.

AC controlling device 114 may further include the electrical switching device 320 (e.g., a dimmable electrical switch). The electrical switching device 320 may be configured to generate a conductive or variably-conductive electrical path between the first electrical terminal 302 and the third electrical terminal 306 in response to the actuation of the electrical switching device 320. In an embodiment, electrical switching device 320 may be actuated in response to receiving a mechanical or electronic signal indicative of an "on" or "dim" command having been input by a user or generated by AC controlling device 114 to control (e.g., turn on or dim) a load device 116 connected to the third electrical terminal 306 via the second ungrounded conductor 316, The electrical switching device 320 may receive the mechanical or electronic signal indicative of the "on" or "dim" command from, for example, memory 324 (e.g., based on a temporal schedule), capacitive sensing device 326, temperature sensing device 328, radiation sensing device 330, audio sensing device 332, one or more buttons in the set of buttons 336, lighting control device 338, power monitoring device 340, remote control device 110, user device 112, any other suitable device, or any combination thereof.

The electrical switching device 320 may be further configured to generate a nonconductive electrical path between the first electrical terminal 302 and the third electrical terminal 306 in response to a deactuation of the electrical switching device. In an embodiment, electrical switching device 320 may be deactuated in response to receiving a mechanical or electronic signal indicative of an "off" command having been input by a user or generated by AC controlling device 114 to control (e.g., turn off) a load device 116 connected to the third electrical terminal 306 via the second ungrounded conductor 316. The electrical switching device 320 may receive the mechanical or electronic signal indicative of the "off" command from, for example, memory 324, capacitive sensing device 326, temperature sensing device 328, radiation sensing device 330, audio sensing device 332, one or more buttons in the set of buttons 336, lighting control device 338, power monitoring device 340, remote control device 110, user device 112, any other suitable device, or any, combination thereof.

AC controlling device 114 may further include a memory 324 and one or more processors 322 coupled to the memory 324 and configured to determine whether the second electrical terminal 304 is connected to the grounded conductor 314. The one or more processors 322 may be further configured to generate, in response to a first determination that the second electrical terminal 304 is connected to the grounded conductor 314, a first control signal configured to permit the performance of a function. The function may include, for example, a capacitive sensing function, a temperature sensing function, a radiation sensing function, an audio sensing function, a wireless communications function, a dimmer switch modification function, a lighting control function, any other suitable function, or any combination thereof. The one or more processors 322 may be further configured to generate, in response to a second determination that the second electrical terminal 304 is not connected to the grounded conductor 314, a second control signal configured to prevent the performance of the function. In an embodiment, the first control signal can be configured to permit the performance of a set of functions that includes the function, and the second control signal can be configured to permit the performance of a subset of the set of functions that does not include the function.

In one example embodiment, AC controlling device 114 may include a capacitive sensing device 326 and the function may include a capacitive sensing function, such as an "always on" capacitive sensing function. The first control signal may be configured to instruct the capacitive sensing device 326 to permit the performance of the capacitive sensing function, whereas the second control signal may be configured to instruct the capacitive sensing device 326 to prevent the performance of the capacitive sensing function.

In another example embodiment, AC controlling device 114 may include a temperature sensing device 328 and the function may include a temperature sensing function. The first control signal may be configured to instruct the temperature sensing device 328 to permit the performance of the temperature sensing function, whereas the second control signal may be configured to instruct the temperature sensing device 328 to prevent the performance of the temperature sensing function.

In another example embodiment, AC controlling device 114 may include a radiation sensing device 330 and the function may include a radiation sensing function (e.g., daylight detection). The first control signal may be configured to instruct the radiation sensing device 330 to permit the performance of the radiation sensing function, whereas the second control signal may be configured to instruct the radiation sensing device 330 to prevent the performance of the radiation sensing function.

In another example embodiment, AC controlling device 114 may include an audio sensing device 332 and the function may include an audio sensing function. The first control signal may be configured to instruct the audio sensing device 332 to permit the performance of the audio sensing function, whereas the second control signal may be configured to instruct the audio sensing device 332 to prevent the performance of the audio sensing function.

In another example embodiment, AC controlling device 114 may include one or more communications devices 334, including but not limited to a wireless communications device, and the function may include a wireless communications function (e.g., WiFi mesh, Bluetooth, 5G). The first control signal may be configured to instruct the wireless communications device to permit the performance of the wireless communications function, whereas the second control signal may be configured to instruct the wireless communications device to prevent the performance of the wireless communications function.

In another example embodiment, AC controlling device 114 may include a set of buttons 336, including but not limited to an actuator device and a dimmer switch, and the function may include a dimmer switch modification function configured to modify a physical position of the dimmer switch using the actuator device. The first control signal may be configured to instruct the actuator device to permit the performance of the dimmer switch modification function, whereas the second control signal may be configured to instruct the actuator device to prevent the performance of the dimmer switch modification function.

In another example embodiment, AC controlling device 114 may include a lighting control device 338 and the function may include a lighting control function configured to control the brightness, color, status, functionality, or any other suitable characteristic of one or more lighting devices included in one or more load devices 116 (e.g., to make the color temperature of a lighting device warmer in the morning and cooler in the evening). The first control signal may be configured to instruct the lighting control device 338 to permit the performance of the lighting control function, whereas the second control signal may be configured to instruct the lighting control device 338 to prevent the performance of the lighting control function.

In another example embodiment, AC controlling device 114 may include a power monitoring device 340 configured to detect an electrical current between the first electrical terminal 302 and the second electrical terminal 304. The one or more processors 322 may be configured to determine the function based on the detected electrical current. For example, the one or more processors 322 may be configured to permit the performance of a set of functions including a first function, a second function, and a third function (e.g., three different functions described herein; controlling three different load devices, such as a first load device, a second load device, and a third device, respectively, of the one or more load devices 116; etc.) when the grounded conductor 314 is connected to the second electrical terminal 304 and the electrical switching device 320 is nonconductive (e.g., the load device 116 is in an "off" position). In another example, the one or more processors 322 may be configured to permit the performance of a first subset of the set of functions including the first function and the second function but not the third function when the grounded conductor 314 is connected to the second electrical terminal 304 and the electrical switching device 320 is in a partially conductive state (e.g., the load device 116 is in a "dimmed" position). In yet another example, the one or more processors 322 may be configured to permit the performance of a second subset of the set of functions including the first function but not the second function or the third function when the grounded conductor 314 is connected to the second electrical terminal 304 and the electrical switching device 320 is in a fully conductive state (e.g., the load device 116 is in an "on" position). In still another example, the one or more processors 322 may be configured to permit the performance of a third subset of the set of functions that includes neither the first function nor the second function nor the third function when the grounded conductor 314 is not connected to the second electrical terminal 304.

In another example embodiment, when the second electrical terminal 304 is not connected to a grounded conductor 314, AC controlling device 114 may be configured to offload the performance of the function to another AC controlling device, the media device 108, the remote control device 110, or the user device 112. For example, AC controlling device 114 may include one or more communications devices 334 configured to communicate with a media device 108. In response to the second determination that the second electrical terminal 304 is not connected to the grounded conductor 314, the one or more processors 322 may be configured to generate a third control signal configured to instruct the media device 108 to permit the performance of the function and transmit, using the one or more communications devices 334, the third control signal to the media device 108. In response to receiving the third control signal from AC controlling device 114, media device 108 may generate: an acknowledgement (ACK) signal, frame, or packet; a negative-acknowledgement (NACK) signal, frame, or packet; results data (e.g., measurement data, any other suitable data, or any combination thereof) corresponding to the performance of the function by the media device 108; or any other suitable signal, frame, packet, or data structure. For example, an ACK signal may be indicative of an acknowledgement that media device 108 has received the third control signal. In another example, a NACK signal may be indicative of an error or that media device 108 has not received the third control signal. Subsequently, AC controlling device 114 can be configured to receive (e.g., by the one or more communications devices 334, any other suitable hardware or software, or any combination thereof) the ACK signal, NACK signal, results data, any other suitable data, or a combination thereof from media device 108.

In another example embodiment, AC controlling device 114 may be configured to control a media device 108 connected to the second ungrounded conductor 316 (e.g., the load wire). For example, the third electrical terminal 306 may be configured to transmit the electricity to a media device 108 through the second ungrounded conductor 316 in response to the actuation of the electrical switching device 320. AC control ling device 114 may include one or more communications devices 334 configured to communicate with the media device 108. The first control signal may be configured to instruct the media device 108 to permit the performance of the function, whereas the second control signal is configured to instruct the media device 108 to prevent the performance of the function. Subsequently, the one or more processors 322 may be configured to transmit, using the one or more communications devices 334, the first control signal or the second control signal to the media device 108.

In an embodiment, AC controlling device 114 may be configured to generate (e.g., by set of buttons 336, capacitive sensing device 326, audio sensing device 332, one or more processors 322, any other suitable circuitry or structures, or any combination thereof) electronic signals indicative of user commands. A user command may correspond to one or more pressed buttons, audio commands, gesture commands, any other suitable commands input, uttered, or motioned by a user, or any combination thereof.

In an embodiment, a user may enter commands on AC controlling device 114 by pressing one or more of the capacitive sensing device 326 or the set of buttons 336, such as on/off, brightness up/down, color change, to name just a few examples. In such aspects, capacitive sensing device 326, set of buttons 336, any circuitry or structures connected thereto, one or more processors 322, or a combination thereof may generate an electronic signal indicative of a button having been pressed by a user in response to the user pressing the button and capacitive sensing device 326, set of buttons 336, any circuitry or structures connected thereto, one or more processors 322, or a combination thereof detecting a change in an electrical resistance, impedance, or capacitance associated with the pressed button.

Additionally or alternatively, in an embodiment, a user may enter commands on AC controlling device 114 by uttering a command within audible range of audio sensing device 332, For example, to turn on a load device 116 connected to AC controlling device 114, the user may say "Light On." In an embodiment, the user may say a trigger word before saying commands, to better enable AC controlling device 114 to distinguish between commands and other spoken words. For example, the trigger word may be "Command." in this case, to turn on the load device 116, the user may say "Command Light Up." In an embodiment, there may be one or more trigger words that are recognized by AC controlling device 114. In such aspects, one or more processors 322 may generate an electronic signal indicative of an audio command having been spoken by a user in response to the user speaking the audio command and audio sensing device 332, any circuitry or structures connected thereto, one or more processors 322, or a combination thereof detecting an audio signal associated with the command.

In an embodiment, AC controlling device 114 may be configured to encrypt (e.g., by cryptographic circuitry 342, one or more processors 322, any other suitable circuitry or structures, or any combination thereof) communications using a symmetric cryptographic technique, an asymmetric cryptographic technique, any other suitable cryptographic technique, or any combination thereof. Thereafter, media device 108 may be configured to receive and decrypt the encrypted communications using any suitable technologies, and perform the function associated with the communication.

In an embodiment, AC controlling device 114 may periodically come to a pre-defined frequency on a periodic basis to exchange communications, communications channel identification information, cryptographic information, any other suitable information, or any combination thereof, with other devices. For example, AC controlling device 114 may periodically come to a 2.4 GHz communications channel every 5, 10, 15, 30, 45, or 60 minutes to exchange communications, communications channel identification information, cryptographic information, any other suitable information, or any combination thereof.

In another example embodiment, when the second electrical terminal 304 is connected to a grounded conductor 314, AC controlling device 114 may be configured to function as a gateway for other AC controlling devices that do not have neutral wires or are running on battery power.

In some embodiments, AC controlling device 114 can include a non-transitory computer-readable: medium having instructions stored thereon that, when executed by one or more processors 322 of the AC controlling device 114, causes the AC controlling device 114 to perform operations including: (i) determining whether an electrical terminal 304 of the AC controlling device 114 is connected to a grounded conductor 314; (ii) generating, in response to determining that the electrical terminal 304 is connected to the grounded conductor 314, a first control signal configured to permit the AC controlling device 114 to perform a function; and (iii) generating, in response to determining that the electrical terminal 304 is not connected to the grounded conductor 314, a second control signal configured to prevent the AC controlling device 114 from performing the function. In some embodiments, the first control signal can be configured to permit the performance of a set of functions that includes the function, whereas the second control signal can be configured to permit the performance of a subset of the set of functions, wherein the subset of the set of functions does not include the function 1n some embodiments, the operations may further include: (iv) detecting an electrical current between the electrical terminal 304 and another electrical terminal 302 connected to an ungrounded conductor 312; and (v) determining the function based on the detected electrical current. In some embodiments, the operations may further include: (vi) generating, by the one or more processors 322 in response to determining that the electrical terminal 304 is not connected to the grounded conductor 314, a third control signal configured instruct a media device 108 to permit the performance of the function; and (vii) transmitting, by one or more communications devices 334 of the AC controlling device 114, the third control signal to the media device 108. In some embodiments, the first control signal can be configured to instruct a media device 108 to permit the performance of the function, the second control signal can be configured to instruct the media device 108 to prevent the performance of the function, and the operations may further include (viii) transmitting the first control signal or the second control signal to the media device 108.

Figure 4:
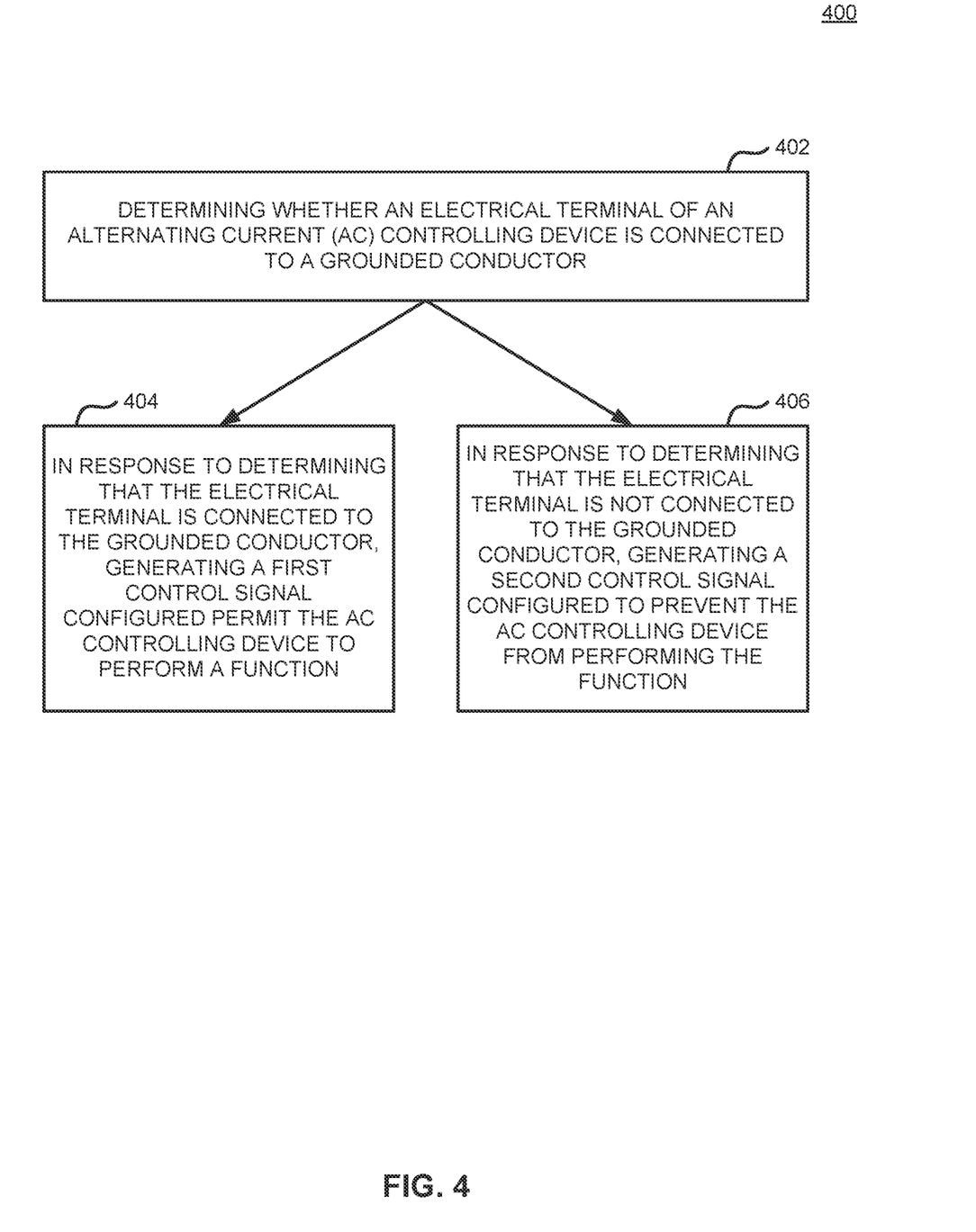
FIG. 4 is a flowchart illustrating a process for modifying the functionality of an AC controlling device, according to some embodiments.

FIG. 4 is a flowchart for a method 400 for modifying the functionality of an AC controlling device, according to an embodiment. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to those example embodiments.

In 402, AC controlling device 114 determines (e.g., by one or more processors 322, any other suitable hardware or software, or any combination thereof) whether an electrical terminal (e.g., second electrical terminal 304) of the AC controlling device 114 is connected to a grounded conductor (e.g., grounded conductor 314). In response to determining that the electrical terminal is connected to the grounded conductor, method 400 proceeds to 404. In response to determining that the electrical terminal is not connected to the grounded conductor, method 400 proceeds to 406.

In 404, AC controlling device 114 generates (e.g., by one or more processors 322, any other suitable hardware or software, or any combination thereof), in response to determining that the electrical terminal is connected to the grounded conductor, a first control signal configured to permit the AC controlling device 114 to perform a function. The function may include, for example, a capacitive sensing function, a temperature sensing function, a radiation sensing function, an audio sensing function, a wireless communications function, a dimmer switch modification function, a lighting control function, any other suitable function, or any combination thereof.

In 406, AC controlling device 114 generates (e.g., by one or more processors 322, any other suitable hardware or software, or any combination thereof), in response to determining that the electrical terminal is not connected to the grounded conductor, a second control signal configured to prevent the AC controlling device 114 from performing the function (e.g., by changing a status of the AC controlling device 114 to a low power consumption mode).

Optionally, AC controlling device 114 can generate (e.g., by one or more processors 322, any other suitable hardware or software, or any combination thereof), in response to determining that the electrical terminal is not connected to the grounded conductor, a third control signal configured to instruct another device to perform the function and transmit (e.g., by one or more communications devices 334, any other suitable hardware or software, or any combination thereof) the third control signal to the other device. The other device can be, for example, another AC controlling device, a media device (e.g., media device 108), a remote control (e.g., remote control device 110), a user device (e.g., user device 112), any other suitable device, or any combination thereof. Optionally, AC controlling device 114 can receive (e.g., by one or more communications devices 334, any other suitable hardware or software, or any combination thereof), from the other device, results data (e.g., measurement data, an ACK or NACK, any other suitable data, or any combination thereof) corresponding to the performance of the function by the other device.

Figure 5:
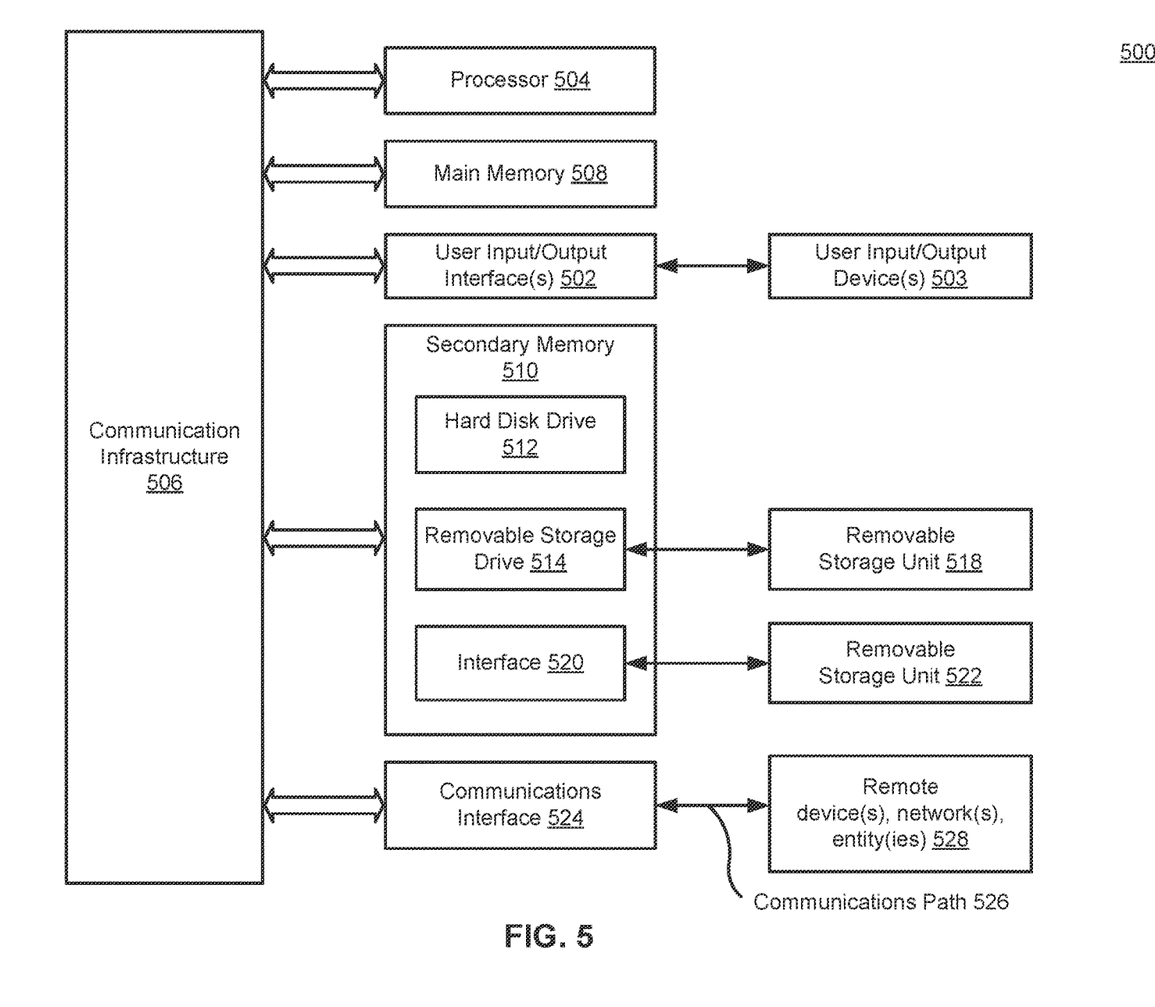
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, computer system 500 can be used to implement any of the embodiments described herein, as well as combinations and sub-combinations thereof.

Computer system 500 includes one or more processors (also called central processing units, or CPUs), such as processor 504. Processor 504 is connected to communications infrastructure 506 (e.g., a bus).

In some embodiments, processor 504 can be a graphics processing unit (GPU). In some embodiments, a GPU may be a processor that is a specialized electronic circuit designed to process mathematically intensive applications. The CPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communications infrastructure 506 through user input/output interface(s) 502.

Computer system 500 also includes main memory 508 (e.g., a primary memory or storage device), such as random access memory (RAM). Main memory 508 can include one or more levels of cache. Main memory 508 may have stored therein control logic (i.e., computer software) and/or data.

Computer system 500 can also include one or more secondary storage devices or memories such as secondary memory 510. Secondary memory 510 can include, for example, hard disk drive 512, removable storage drive 514 (e.g., a removable storage device), or both. Removable storage drive 514 can be a floppy disk drive, a magnetic tape drive, a compact disk drive, an optical storage device, tape backup device, and/or any other storage device/drive.

Removable storage drive 514 can interact with removable storage unit 518. Removable storage unit 518 includes a computer usable or readable storage device having stored thereon computer software (e.g., control logic) and/or data. Removable storage unit 518 can be a floppy disk, magnetic tape, compact disk, DVD, optical storage disk, and/any other computer data storage device. Removable storage drive 514 may read from and/or write to removable storage unit 518.

In some embodiments, secondary memory 510 can include other means, devices, components, instrumentalities or other approaches for allowing computer programs and/or other instructions and/or data to be accessed by computer system 500. Such means, devices, components, instrumentalities or other approaches can include, for example, removable storage unit 522 and interface 520. Examples of removable storage unit 522 and interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communications interface 524 (e.g., a network interface). Communications interface 524 may enable computer system 500 to communicate and interact with any combination of external or remote devices, external or remote networks, remote entities, etc. (individually and collectively referenced by reference number 528). For example, communications interface 524 can allow computer system 500 to communicate with external or remote devices 528 over communications path 526, which can be wired, wireless, or a combination thereof, and which can include any combination of LANs, WA s, the Internet, etc. Control logic and/or data can be transmitted to and from computer system 500 via communications path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (PRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical interchange format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (MAC), Audio Data Transport Stream (APIS), Audio interchange File Format (RIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multi stream (MS12), Free Lossless Audio Codec (FLOC), Linear Pulse Code Modulation (LPCM or PCM), Matroska Audio (MICA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media. Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (BON), HD Adaptive Streaming, HTTP Dynamic Streaming, HTTP Live Streaming (HS), HTTP Secure (MATS), Hypertext Transfer Protocol (HTTP), Internet Information Services (µS) Smooth Streaming (SMOOTH), Media RSS (MISS), MPEG Dynamic Adaptive Streaming over HTTP (MPEG-DASH or DASH), MPEG transport stream (MPEG-TS or IS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), PlayReady, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

The invention claimed is:

1. An apparatus, comprising:
a first electrical terminal configured to connect to a first ungrounded conductor and receive electricity from the first ungrounded conductor;
a second electrical terminal configured to connect to a grounded conductor and transmit a first portion of the electricity received from the first ungrounded conductor to the grounded conductor in response to a connection of the second electrical terminal to the grounded conductor;
a third electrical terminal configured to connect to a second ungrounded conductor and transmit a second portion of the electricity received from the first ungrounded conductor to the second ungrounded conductor in response to an actuation of an electrical switching device;
the electrical switching device, wherein the electrical switching device is configured to generate a conductive electrical path between the first electrical terminal and the third electrical terminal in response to the actuation of the electrical switching device;
a memory; and
at least one processor coupled to the memory and configured to:
determine whether the second electrical terminal is connected to the grounded conductor;
in response to a first determination that the second electrical terminal is connected to the grounded conductor, generate a first control signal configured to permit performance of a function by the apparatus; and
in response to a second determination that the second electrical terminal is not connected to the grounded conductor, (i) generate a second control signal configured to instruct another apparatus to perform the function and (ii) transmit, using a communications device coupled to the other apparatus, the second control signal to the other apparatus.

2. The apparatus of claim 1, wherein the other apparatus is one of:
an alternating current (AC) controlling device;
a media device;
a remote control; or
a user device.

3. The apparatus of claim 1, wherein:
the first ungrounded conductor is a line wire;
the grounded conductor is a neutral wire; and
the second ungrounded conductor is a load wire.

4. The apparatus of claim 1, wherein:
the apparatus further comprises a capacitive sensing device;
the function comprises a capacitive sensing function;
the first control signal is configured to instruct the capacitive sensing device to permit a performance of the capacitive sensing function; and
the second control signal is configured to instruct the other apparatus to perform the capacitive sensing function.

5. The apparatus of claim 1, wherein:
the apparatus further comprises a temperature sensing device;
the function comprises a temperature sensing function;
the first control signal is configured to instruct the temperature sensing device to permit a performance of the temperature sensing function; and
the second control signal is configured to instruct the other apparatus to perform the temperature sensing function.

6. The apparatus of claim 1, wherein:
the apparatus further comprises a radiation sensing device;
the function comprises a radiation sensing function;
the first control signal is configured to instruct the radiation sensing device to permit a performance of the radiation sensing function; and
the second control signal is configured to instruct the other apparatus to perform the radiation sensing function.

7. The apparatus of claim 1, wherein:
the apparatus further comprises an audio sensing device;
the function comprises an audio sensing function;
the first control signal is configured to instruct the audio sensing device to permit a performance of the audio sensing function; and
the second control signal is configured to instruct the other apparatus to perform the audio sensing function.

8. The apparatus of claim 1, wherein:
the apparatus further comprises a wireless communications device;
the function comprises a wireless communications function;
the first control signal is configured to instruct the wireless communications device to permit a performance of the wireless communications function; and
the second control signal is configured to instruct the other apparatus to perform the wireless communications function.

9. The apparatus of claim 1, wherein:
the apparatus further comprises an actuator device and a dimmer switch;
the function comprises a dimmer switch modification function;
the first control signal is configured to instruct the actuator device to permit a performance of the dimmer switch modification function; and
the second control signal is configured to instruct the other apparatus to perform the dimmer switch modification function.

10. The apparatus of claim 1, wherein:
the apparatus further comprises a lighting control device;
the function comprises a lighting control function;
the first control signal is configured to instruct the lighting control device to permit a performance of the lighting control function; and
the second control signal is configured to instruct the other apparatus to perform the lighting control function.

11. The apparatus of claim 1, wherein:
the apparatus further comprises a power monitoring device configured to detect an electrical current between the first electrical terminal and the second electrical terminal; and
the at least one processor is configured to determine the function based on the detected electrical current.

12. The apparatus of claim 1, wherein:
the apparatus comprises the communications device.

13. A non-transitory computer-readable medium having instructions stored thereon that, when executed by at least one processor of an alternating current (AC) controlling device, causes the AC controlling device to perform operations comprising:
determining whether an electrical terminal of the AC controlling device is connected to a grounded conductor; and
in response to determining that the electrical terminal is not connected to the grounded conductor, (i) generating a first control signal configured to prevent the AC controlling device from performing a function; (ii) generating a second control signal configured to instruct another device to perform the function, and (iii) transmitting, by a communications device of the AC controlling device, the second control signal to the other device.

14. The non-transitory computer-readable medium of claim 13, wherein the other device comprises one of:
another AC controlling device;
a media device;
a remote control; or
a user device.

15. The non-transitory computer-readable medium of claim 13, wherein the operations further comprise:
detecting an electrical current between the electrical terminal and another electrical terminal connected to an ungrounded conductor; and
determining the function based on the detected electrical current.

16. The non-transitory computer-readable medium of claim 13, wherein the function comprises one of:
a capacitive sensing function;
a temperature sensing function;
a radiation sensing function;
an audio sensing function;
a wireless communications function;
a dimmer switch modification function; or
a lighting control function.

17. A computer-implemented method, comprising:
determining, by at least one computer processor of an alternating current (AC) controlling device, whether an electrical terminal of the AC controlling device is connected to a grounded conductor;
in response to determining that the electrical terminal is not connected to the grounded conductor, (i) generating a first control signal configured to prevent the AC controlling device from performing a function; (ii) generating a second control signal configured to instruct another device to perform the function, and (iii) transmitting, by a communications device of the AC controlling device, the second control signal to the other device.

18. The computer-implemented method of claim 17, wherein the other device comprises one of:
another AC controlling device;
a media device;
a remote control; or
a user device.

19. The computer-implemented method of claim 18, wherein the function comprises one of:
a capacitive sensing function;
a temperature sensing function;
a radiation sensing function;
an audio sensing function;
a wireless communications function;
a dimmer switch modification function; or
a lighting control function.

20. The computer-implemented method of claim 17, further comprising:
detecting an electrical current between the electrical terminal and another electrical terminal connected to an ungrounded conductor; and
determining the function based on the detected electrical current.

* * * * *

UNITED STATES PATENT AND TRADEMARK OFFICE
CERTIFICATE OF CORRECTION

PATENT NO. : 12,248,330 B2
APPLICATION NO. : 18/384349
DATED : March 11, 2025
INVENTOR(S) : Garner It is certified that error appears in the above-identified patent and that said Letters Patent is hereby corrected as shown below:

In the Specification

In Column 1, Line 39, delete "thereof" and insert -- thereof, --, therefor.

In Column 2, Line 64, delete "extranet." and insert -- extranet, --, therefor.

In Column 3, Lines 23-34, delete "[OM] User device 112 may interact ……….. according to the user commands." and insert -- User device 112 may interact ……….. according to the user commands. --, at Line 24, as a new paragraph.

In Column 5, Line 43, delete "conductor 316," and insert -- conductor 316. --, therefor.

In Column 5, Line 61, delete "turn oft)" and insert -- turn off) --, therefor.

In Column 6, Line 4, delete "any," and insert -- any --, therefor.

In Column 8, Line 42, delete "control ling" and insert -- controlling --, therefor.

In Column 9, Line 12, delete "332," and insert -- 322. --, therefor.

In Column 9, Line 18, delete "in this" and insert -- In this --, therefor.

In Column 9, Line 56, delete "computer-readable:" and insert -- computer-readable --, therefor.

In Column 10, Line 8, delete "function 1n" and insert -- function. In --, therefor.

In Column 11, Line 41, delete "CPU" and insert -- GPU --, therefor.

In Column 12, Line 29, delete "WA s," and insert -- WANs, --, therefor.

Signed and Sealed this
Eighteenth Day of November, 2025

John A. Squires
*Director of the United States Patent and Trademark Office*

CERTIFICATE OF CORRECTION (continued)
U.S. Pat. No. 12,248,330 B2

In Column 12, Line 58, delete "(PRM)," and insert -- (DRM), --, therefor.

In Column 12, Line 65, delete "Graphical interchange format (GIF)," and insert -- Graphical Interchange Format (GIF), --, therefor.

In Column 13, Line 6, delete "(MAC)," and insert -- (ALAC), --, therefor.

In Column 13, Line 7, delete "(APIS)," and insert -- (ADTS), --, therefor.

In Column 13, Line 8, delete "(RIFF)," and insert -- (AIFF), --, therefor.

In Column 13, Line 11, delete "Multi stream" and insert -- Multistream --, therefor.

In Column 13, Line 12, delete "(FLOC)," and insert -- (FLAC), --, therefor.

In Column 13, Line 13, delete "(MICA)," and insert -- (MKA), --, therefor.

In Column 13, Line 17, delete "Media." and insert -- Media --, therefor.

In Column 13, Line 23, delete "interleave" and insert -- Interleave --, therefor.

In Column 13, Line 35, delete "(BON)," and insert -- (JSON), --, therefor.

In Column 13, Line 37, delete "(HS), HTTP Secure (MATS)," and insert -- (HLS), HTTP Secure (HTTPS), --, therefor.

In Column 13, Line 38, delete "(μS)" and insert -- (IIS) --, therefor.

In Column 13, Line 39, delete "(MISS)," and insert -- (MRSS), --, therefor.

In Column 13, Line 41, delete "IS)," and insert -- TS), --, therefor.